United States Patent
Zhou

(10) Patent No.: US 11,690,084 B2
(45) Date of Patent: Jun. 27, 2023

(54) UPLINK RESOURCE ALLOCATION METHOD, APPARATUS AND DEVICE, AND STORAGE MEDIUM

(71) Applicant: BEIJING XIAOMI MOBILE SOFTWARE CO., LTD., Beijing (CN)

(72) Inventor: Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 374 days.

(21) Appl. No.: 17/265,768

(22) PCT Filed: Aug. 10, 2018

(86) PCT No.: PCT/CN2018/100020
§ 371 (c)(1),
(2) Date: Feb. 3, 2021

(87) PCT Pub. No.: WO2020/029265
PCT Pub. Date: Feb. 13, 2020

(65) Prior Publication Data
US 2021/0235438 A1    Jul. 29, 2021

(51) Int. Cl.
*H04W 72/51* (2023.01)
*H04W 72/044* (2023.01)

(52) U.S. Cl.
CPC ......... *H04W 72/51* (2023.01); *H04W 72/044* (2013.01)

(58) Field of Classification Search
CPC . H04W 72/0446; H04W 72/21; H04W 72/12; H04W 72/1268; H04W 72/20;
(Continued)

(56) References Cited

U.S. PATENT DOCUMENTS 8,358,615 B2   1/2013  Ali et al.
8,565,205 B2  10/2013  Ho et al.
(Continued)

FOREIGN PATENT DOCUMENTS

CN    102792620 A  * 11/2012  .......... H04L 1/0003
CN    102792620 A    11/2012
(Continued)

OTHER PUBLICATIONS

Nokia Siemens Networks, Nokia Corporation, "Remaining issues on PHR/ PCMAX,ctriggering and reporting", 3GPP TSG-RAN WG2 Meeting #72bis R2-110375, Dublin, Ireland, Jan. 17-21, 2011, (3p).
(Continued)

*Primary Examiner* — Dung Hong
(74) *Attorney, Agent, or Firm* — Arch & Lake LLP

(57) ABSTRACT

A method, apparatus, and a storage medium for uplink resource allocation are provided. The method includes in a period of time during which UE occupies a target channel, when it is required to allocate an uplink resource to the UE, determining whether a first number is greater than 0, wherein the first number is the number of uplink resources that can be allocated in the period of time; if the first number is greater than 0, allocating an uplink resource to the UE, wherein the first number is obtained according to a specific absorption rate of the UE, and the target channel is located on an unlicensed frequency spectrum.

20 Claims, 8 Drawing Sheets

(58) Field of Classification Search
CPC . H04W 24/10; H04W 72/0453; H04W 72/04; H04W 16/14; H04W 28/26; H04W 48/08; H04W 72/51; H04W 72/044
See application file for complete search history.

(56) References Cited

U.S. PATENT DOCUMENTS

| | | | |
|---|---|---|---|
| 9,107,175 B2 | 8/2015 | Kim et al. | |
| 2002/0167930 A1 | 11/2002 | Pearl | |
| 2010/0014430 A1* | 1/2010 | Oka | H04W 72/542 |
| | | | 370/242 |
| 2011/0034135 A1* | 2/2011 | Ali | H04B 1/3838 |
| | | | 455/127.1 |
| 2011/0222469 A1* | 9/2011 | Ali | H04L 1/0009 |
| | | | 370/328 |
| 2012/0147801 A1* | 6/2012 | Ho | H04W 52/365 |
| | | | 370/311 |
| 2012/0176979 A1* | 7/2012 | Kim | H04W 72/21 |
| | | | 370/329 |
| 2014/0248892 A1* | 9/2014 | Wilson | H04W 52/146 |
| | | | 455/561 |
| 2017/0265148 A1* | 9/2017 | Balasu | H04W 52/146 |
| 2017/0332333 A1* | 11/2017 | Santhanam | H04W 52/365 |

FOREIGN PATENT DOCUMENTS

| | | | | | |
|---|---|---|---|---|---|
| CN | 103270797 | A | | 8/2013 | |
| CN | 103329602 | A | | 9/2013 | |
| CN | 106714238 | A | * | 5/2017 | ............ H04W 28/08 |
| CN | 107979868 | A | | 5/2018 | |
| KR | 20100081045 | A | * | 7/2010 | |
| TW | 200922347 | A | * | 5/2009 | ........... C07D 403/12 |
| WO | WO-2009069880 | A1 | * | 6/2009 | ............ H04J 3/1694 |
| WO | WO-2010085187 | A1 | * | 7/2010 | ........... H04L 5/0053 |
| WO | 2017197096 | A1 | | 11/2011 | |
| WO | WO-2017197096 | A1 | * | 11/2017 | ............... H04L 5/14 |

OTHER PUBLICATIONS

Alcatel-Lucent, Alcatel-Lucent ShangHai Bell, "Clarification on Solution 1 in § 5.2: forking", SA WG2 Meeting S2#108 S2-150970(revision of S2-150970) eWebRTCi / Rel13, (4p).

Extended European Search Report in the European Application No. 18929515.7, dated Feb. 17, 2022, (10p).

English translation of Written Opinion of the International Search Authority in the International Application No. PCT/CN2018/100020, dated Apr. 22, 2019, (3p).

International Search Report of PCT Application No. PCT/CN2018/100020 dated Apr. 22, 2019 with English translation (4p).

* cited by examiner

UPLINK RESOURCE ALLOCATION METHOD, APPARATUS AND DEVICE, AND STORAGE MEDIUM

CROSS-REFERENCE TO RELATED APPLICATION

This application is the US national phase application of International Application No. PCT/CN2018/100020, filed on Aug. 10, 2018, the entire contents of which are incorporated herein by reference for all purposes.

TECHNICAL FIELD

The present disclosure relates to the technical field of wireless communications, and particularly, to a method and an apparatus for uplink resource allocation, a device, and a storage medium.

BACKGROUND

User Equipment (UE) may generate a certain amount of radiation during uplink transmission. When UE performs uplink transmission frequently in a certain time period, an accumulated radiation amount generated by the UE in this time period is likely to be larger, and the larger amount of radiation is likely to cause harm to a human body.

At present, how to avoid UE, especially UE working on an unlicensed frequency band, frequently performing uplink transmission in a period of time to further avoid harms of radiation accumulatively generated by the UE to a human body has become a problem urgent to be solved.

SUMMARY

The present disclosure provides a method and an apparatus for uplink resource allocation, a device, and a storage medium.

According to a first aspect of the present disclosure, a method for uplink resource allocation is provided, which includes that: whether a first number is greater than 0 is determined when an uplink resource is required to be allocated to a UE within a period of time, the first number being a number of remaining allocable uplink resources within the period of time; and the uplink resource is allocated to the UE when the first number is greater than 0.

Here, the first number may be obtained according to a specific absorption rate (SAR) of the UE, and the target channel may be on an unlicensed spectrum.

According to a second aspect of the present disclosure, a method for uplink resource allocation is provided, which may include that: whether a first number is greater than 0 is determined when an uplink resource is required to be requested from a base station within a period of time during which a target channel is occupied, the first number being a number of remaining allocable uplink resources within the period of time; and the uplink resource is requested from the base station in response to determining that the first number is greater than 0.

The first number may be obtained according to an SAR of UE, and the target channel may be on an unlicensed spectrum. The unlicensed spectrum may be, for example, an unlicensed frequency spectrum.

According to a third aspect of the present disclosure, a base station is provided, which includes: one or more processors; and a tangible non-transitory computer-readable storage medium configured to store a plurality of instructions executable by the one or more processors. The one or more processors may be configured to: determine whether a first number is greater than 0 when an uplink resource is required to be allocated to a user equipment (UE) within a period of time during which the UE occupies a target channel, the first number being a number of remaining allocable uplink resources within the period of time; and allocate the uplink resource to the UE in response to determining that the first number is greater than 0.

The first number may be obtained according to an SAR of the UE, and the target channel may be on an unlicensed spectrum.

According to a fourth aspect of the present disclosure, UE is provided, which includes: one or more processors; and a tangible non-transitory computer-readable storage medium configured to store a plurality of instructions executable by the one or more processors. The one or more processors may be configured to: determine whether a first number is greater than 0 when an uplink resource is required to be requested from a base station within a period of time during which a target channel is occupied, the first number being a number of remaining allocable uplink resources within the period of time; and request the uplink resource from the base station when the first number is greater than 0.

The first number may be obtained according to an SAR of the UE, and the target channel may be on an unlicensed spectrum.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
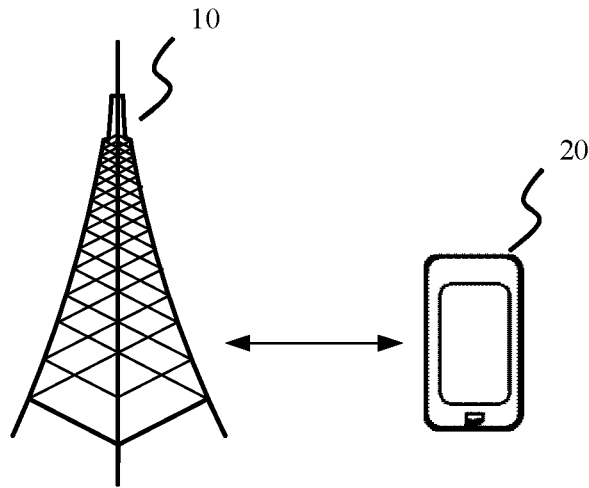
FIG. 1 is a schematic diagram of an implementation environment according to an exemplary embodiment.

For making the purposes, technical solutions and advantages of the present disclosure clearer, implementation modes of the present disclosure will further be described below in combination with the accompanying drawings in detail.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

During a practical application, UE may generate certain radiation during uplink transmission, and if the UE accumulatively generates a relatively large amount of radiation during uplink transmission in a period time, a human body may be harmed.

Under normal circumstances, a specific absorption rate (SAR) may be used to measure an amount of radiation generated by a UE during uplink transmission per unit time. The SAR refers to electromagnetic radiation energy absorbed by every kilogram of human tissues per unit time. During the practical application, an SAR of a UE is related to an overall design of the UE and uplink transmission power of the UE. For two UEs with the same overall design, an SAR of the UE with higher uplink transmission power is higher. For two UEs with the same uplink transmission power but different overall designs, SARs of the two UEs may also be different.

For ensuring the safety of a human body, an SAR of a UE is usually required to be lower than a certain threshold. For example, in a standard developed in the United States, an SAR of a UE is required to be lower than 1.6 W/kg, and in a standard established in the Europe, an SAR of a UE is required to be lower than 2.0 W/kg. At present, some UEs may adjust their own SARs. For example, some UEs may operate at different uplink transmission powers. These UEs may adjust their own SARs by changing the uplink transmission powers. For a UE capable of adjusting its own SAR, a maximum value of the SAR thereof is required to be lower than a certain threshold, namely required to meet a standard requirement.

Under the condition that the SAR of the UE is constant, if the UE frequently performs uplink transmission within a period of time, the UE may accumulatively generate a relatively large amount of radiation during this period of time. In such case, even though the SAR of the UE meets a standard requirement, the radiation accumulatively generated by the UE may also be harmful to a human body.

For UE working on a licensed spectrum, the ratio of uplink transmission of the UE to downlink transmission of the UE is usually fixed. Therefore, in actual application, the UE working on the licensed spectrum may usually not frequently perform uplink transmission within a period of time, and the condition that radiation accumulatively generated by the UE harms a human body may not exist.

However, with the development of wireless communication technologies, more and more communication systems may work on unlicensed spectrums. Under a normal condition, a Listen Before Talk (LBT) mechanism is usually adopted for communication on an unlicensed spectrum. That is, UE is required to monitor a channel on the unlicensed spectrum at first before transmitting communication data and may occupy the channel to transmit the communication data only when the channel is detected to be idle. In addition, a duration of occupying the channel by the UE cannot exceed Maximum Channel Occupancy Time (MCOT) or Channel Occupancy Time (COT). When the duration during which the channel is occupied reaches the MCOT or the COT, the UE is required to perform LBT again.

A moment at which the UE detects that a channel on an unlicensed spectrum is in an idle state is not fixed, and in addition, the UE, after detecting that the channel on the unlicensed spectrum is in the idle state, may occupy the channel for only a period of time. Therefore, for fully utilizing the channel on the unlicensed spectrum for data transmission, in the communication on the unlicensed spectrum, the ratio of the UE's uplink transmission to the UE's downlink transmission is usually more flexible, which results in that the UE working on the unlicensed spectrum is very likely to perform uplink transmission frequently within a period of time, and therefore, it is likely that the accumulated radiation generated by the UE causes harm to a human body.

The embodiments of the present disclosure provide a method for uplink resource allocation. Harms of radiation accumulatively generated by UE working on an unlicensed spectrum within a period of time to a human body may be avoided. In the uplink resource allocation method, within in a time period during which the UE occupies a target channel on an unlicensed spectrum, when a base station is required to allocate an uplink resource to the UE, the base station may determine whether the number of remaining allocable uplink resources in the time period is greater than 0 or not, and when the number of the remaining allocable uplink resources is greater than 0, allocate the uplink resource to the UE. The number of the remaining allocable uplink resources is obtained according to an SAR of the UE. In such a manner, it may be ensured that a proportion of uplink transmission in the time period during which the UE occupies the target channel meets a certain requirement, so that harms of radiation accumulatively generated by the UE to a human body are avoided.

An implementation environment involved in an uplink resource allocation method provided by the embodiments of the present disclosure will be described below.

FIG. 1 is a schematic diagram of an implementation environment involved in an uplink resource allocation method according to an embodiment of the present disclosure. As illustrated in FIG. 1, the implementation environment may include a base station 10 and a UE 20. The base station 10 may be connected with the UE 20 through a communication network. The UE 20 is any UE in a cell served by the base station 10.

The communication network may be at least one of a Fifth Generation Mobile Communication Technology (5G) communication network, a Long Term Evolution (LTE) communication network, or other communication networks similar to the 5G communication network and the LTE communication network.

Figure 2:
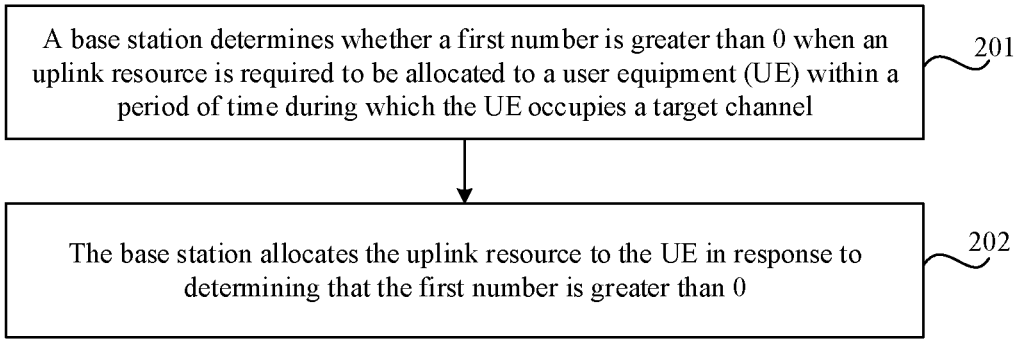
FIG. 2 is a flowchart of a method for uplink resource allocation according to an exemplary embodiment.

FIG. 2 is a flowchart of a method for uplink resource allocation according to an exemplary embodiment. As illustrated in FIG. 2, the method for uplink resource allocation is applied to the base station 10 illustrated in FIG. 1. The method for uplink resource allocation includes the following steps.

In 201, the base station determines whether a first number is greater than 0 when an uplink resource is required to be allocated to a UE within a period of time during which the UE occupies a target channel. The first number may be, for example, a first number of uplink resources.

In 202, the base station allocates the uplink resource to the UE in response to determining that the first number is greater than 0.

The first number is the number of remaining allocable uplink resources in the period of time during which the UE occupies the target channel, the first number is obtained according to an SAR of the UE, and the target channel is on an unlicensed spectrum.

According to the method for uplink resource allocation provided in the embodiment of the present disclosure, in the time period during which the UE occupies the target channel on the unlicensed spectrum, when the uplink resource is required to be allocated to the UE, it is determined whether the number of the remaining allocable uplink resources in the time period is greater than 0 or not, and when the number of the remaining allocable uplink resources is greater than 0, the uplink resource is allocated to the UE, the number of the remaining allocable uplink resources is obtained according to the SAR of the UE. In such a manner, it may be ensured that a proportion of uplink transmission in the time period during which the UE occupies the target channel is relatively small, so that harms of radiation accumulatively generated by the UE to a human body are avoided.

Figure 3:
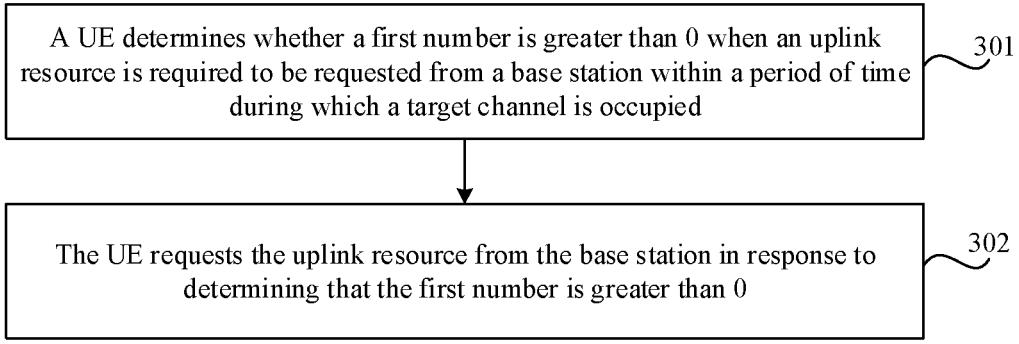
FIG. 3 is a flowchart of a method for uplink resource allocation according to an exemplary embodiment.

FIG. 3 is a flowchart of a method for uplink resource allocation according to an exemplary embodiment. As illustrated in FIG. 3, the method for uplink resource allocation is applied to the UE 20 illustrated in FIG. 1. The method for uplink resource allocation includes the following steps.

In 301, the UE determines whether a first number is greater than 0 when an uplink resource is required to be requested from a base station within a period of time during which a target channel is occupied.

In 302, the UE requests the uplink resource from the base station in response to determining that the first number is greater than 0.

The first number is the number of remaining allocable uplink resources in the period of time during which the UE occupies the target channel, the first number is obtained according to an SAR of the UE, and the target channel is on an unlicensed spectrum.

According to the method for uplink resource allocation provided in the embodiment of the present disclosure, in the time period during which the UE occupies the target channel on the unlicensed spectrum, when the uplink resource is required to be requested from the base station, the UE determines whether the number of the remaining allocable uplink resources in the time period is greater than 0 or not, and when the number of the remaining allocable uplink resources is greater than 0, the uplink resource is requested from the base station, the number of the remaining allocable uplink resources is obtained according to the SAR of the UE. In such a manner, it may be ensured that a proportion of uplink transmission in the time period during which the UE occupies the target channel is relatively small, so that harms of radiation accumulatively generated by the UE to a human body are avoided.

Figure 4:
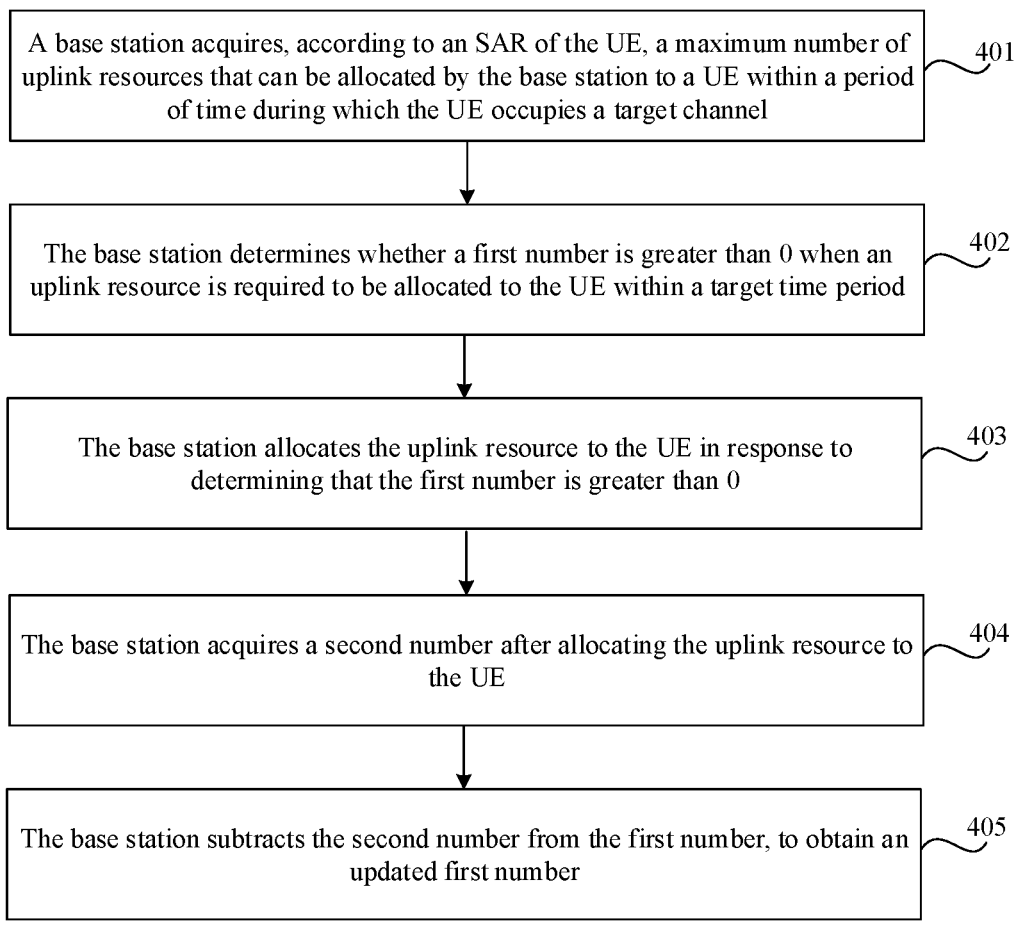
FIG. 4 is a flowchart of a method for uplink resource allocation according to an exemplary embodiment.

FIG. 4 is a flowchart of a method for uplink resource allocation according to an exemplary embodiment. As illustrated in FIG. 4, the method for uplink resource allocation is applied to the implementation environment illustrated in FIG. 1. The method for uplink resource allocation includes the following steps.

In 401, a base station acquires, according to an SAR of a UE, a maximum number of uplink resources that can be allocated by the base station to the UE within a period of time during which the UE occupies a target channel.

The target channel is on an unlicensed spectrum. A duration of the period of time during which the UE occupies the target channel may be MCOT or COT. For convenience of description, the "the period of time during which the UE occupies the target channel" is collectively referred to as a target time period hereinafter for short.

As described above, the SARs of different UEs are very likely to be different. For UE with a relatively high SAR, a proportion of uplink transmission in a period of time may be relatively low on the premise of ensuring that accumulatively generated radiation does not harm a human body. For UE with a relatively low SAR, a proportion of uplink transmission in a period of time may be relatively high on the premise of ensuring that accumulatively generated radiation does not harm a human body.

Therefore, for ensuring that radiation accumulatively generated by the UE during uplink transmission in the target time period does not harm a human body, in the embodiment of the present disclosure, before the UE occupies the target channel, the base station may acquire, according to the SAR of the UE, the maximum number (called the maximum number hereinafter for short) of the uplink resources that the base station can allocate to the UE in the target time period. Here, the uplink resource may be a slot, a mini-slot, a symbol, a subframe, or the like. The uplink resource is used for the UE to perform uplink transmission.

In the target time period, if the number of uplink resources allocated by the base station to the UE reaches the maximum number, the amount of radiation accumulatively generated by the UE during uplink transmission may be exactly equal to a critical amount of radiation harmful to the human body. Or, if the number of the uplink resources allocated by the base station to the UE reaches the maximum number, a ratio of the amount of radiation accumulatively generated by the UE during uplink transmission to the critical amount of radiation may be exactly equal to a preset ratio. The preset ratio is less than 1, and the preset ratio may be specified by a communication system (for example, a communication standard).

Three exemplary manners in which the base station acquires the maximum number are provided in the embodiment of the present disclosure, and will be described below one by one.

In a first manner: the base station receives the SAR from the UE and acquires the maximum number according to the received SAR.

After the UE accesses a communication network or after the UE starts to work on the unlicensed spectrum, the UE may report its own SAR to the base station. UE capable of adjusting its own SAR may also adjust the SAR and report the adjusted SAR to the base station.

Optionally, the UE may send the SAR to the base station through physical-layer uplink control signaling, high-layer signaling, Media Access Control (MAC) Control Element (CE) signaling or the like.

The base station, after receiving the SAR reported by the UE, may query a locally stored SAR comparison table according to the SAR reported by the UE. The SAR comparison table stores at least one set of correspondences between SARs and uplink ratios. The uplink ratio indicates a ratio of uplink transmission of the UE to all data transmission of the UE per unit time.

The base station, after querying the locally stored SAR comparison table according to the SAR reported by the UE, may obtain a target uplink ratio corresponding to the SAR reported by the UE. The UE may acquire a target ratio according to the target uplink ratio. The target ratio is a ratio of a maximum number of uplink resources that the base station can allocate to the UE per unit time to the number of all communication resources in the unit time. The communication resources may include uplink resources and downlink resources, and the downlink resources are used for downlink transmission of the UE.

Of course, the ratio of the maximum number of the uplink resources that the base station can allocate to the UE per the unit time to the number of all the communication resources per the unit time may also be directly stored in the SAR comparison table. In such case, the base station, after querying the locally stored SAR comparison table according to the SAR reported by the UE, may directly obtain the target ratio.

After obtaining the target ratio, the base station may acquire, according to the target ratio and a duration of the target time period (as described above, the duration may be the MCOT or the COT), the maximum number of the uplink resources that the base station can allocate to the UE in the target time period.

In a second manner: the base station receives the target ratio from the UE and acquires the maximum number according to the received target ratio.

In this manner, the UE may locally store the SAR comparison table, and the UE may query the SAR comparison table according to its own SAR to obtain the target ratio.

After the UE accesses the communication network, or after the UE starts to work on the unlicensed spectrum, or after the UE adjusts the SAR, the UE may report the target ratio to the base station.

After receiving the target ratio, the base station may acquire, according to the target ratio and the duration of the target time period, the maximum number of the uplink resources that the base station can allocate to the UE in the target time period.

In a third manner: the base station receives the maximum number from the UE.

In this manner, the UE may locally store the SAR comparison table, and the UE may query the SAR comparison table according to its own SAR to obtain the target ratio.

After obtaining the target ratio, the UE may acquire, according to the target ratio and the duration of the target time period, the maximum number of the uplink resources that the base station can allocate to the UE in the target time period.

After the UE accesses the communication network, or after the UE starts to work on the unlicensed spectrum, or after the UE adjusts the SAR, the UE may report the obtained maximum number to the base station.

In 402, the base station determines whether a first number is greater than 0 when an uplink resource is required to be allocated to the UE in the target time period.

The first number refers to the number of remaining allocable uplink resources within the target time period at the current moment.

Optionally, when the UE starts to occupy the target channel, namely under the condition that the UE has yet not allocated any uplink resource to the UE, the base station may determine the maximum number acquired in step 401 as the first number.

Optionally, after the UE has occupied the target channel for a period of time (a duration of the period of time is less than the MCOT or the COT), the first number may be equal to a difference between the maximum number acquired in step 401 and the number of uplink resources that the base station has allocated to the UE.

For example, the UE starts occupying the target channel at a moment 0 and stops occupying the target channel at a moment 2. The first number at the moment 0 may be the maximum number, acquired in step 401, of the uplink resources that the base station can allocate to the UE. The maximum number may be 3. If the base station has allocated one uplink resource to the UE before a moment 1 (the moment 1 is between the moment 0 and the moment 2), at the moment 1, the first number may be a difference between 3 and 1, i.e., 2.

It is to be pointed out that the abovementioned condition that "the base station is required to allocate the uplink resource to the UE" may refer to that the base station receives an uplink resource allocation request sent by the UE. For example, the uplink resource allocation request may include a Scheduling Request (SR) or a Buffer State Report (BSR). Of course, besides the condition that the base station receives the uplink resource allocation request sent by the UE, the condition that the base station is required to allocate the uplink resource to the UE may also include another condition, and elaborations thereof are omitted in the embodiment of the present disclosure.

In 403, the base station allocates the uplink resource to the UE in response to determining that the first number is greater than 0.

When the first number is greater than 0, it is indicated that the number of the uplink resources that the base station has allocated to the UE at present has yet not reached the maximum number of the uplink resources that the base station can allocate to the UE. In the above example, the first number at the moment 1 is 2, which is greater than 0, and it is indicated that the number (i.e., 1) of the uplink resources that the base station has allocated to the UE at the moment 1 has yet not reached the maximum number (i.e., 3) of the uplink resources that the base station can allocate to the UE.

In such case, allocation of the uplink resource to the UE by the base station, i.e., uplink transmission of the UE, may not cause the radiation accumulatively generated by the UE in the target time period to be harmful to the human body. Therefore, under the condition that the first number is greater than 0, the base station may allocate the uplink resource to the UE.

When the first number is equal to 0, it is indicated that the number of the uplink resources that the base station has allocated to the UE at present has reached the maximum number of the uplink resources that the base station can allocate to the UE. In such case, allocation of the uplink resource to the UE by the base station, i.e., uplink transmission of the UE, is very likely to cause the radiation accumulatively generated by the UE in the target time period to be harmful to the human body. Therefore, under the condition that the first number is equal to 0, the base station may not allocate any uplink resource to the UE.

Optionally, when the first number is greater than 0, it is likely that the number of uplink resources that the base station is required to allocate to the UE is greater than the first number. In such case, the base station may allocate uplink resources in a number equal to the first number to the UE to avoid harms of the radiation accumulatively generated by the UE in the target time period to the human body.

Optionally, in some cases, for meeting a requirement of a communication service, the UE is required to perform uplink transmission of some communication data (called target communication data hereinafter) in the target time period. For example, in the target time period, the UE may be required to send a hybrid automatic repeat request (HARQ) for downlink transmission to the base station such that the base station determines whether the UE correctly receives communication data transmitted by the base station.

In order to ensure that the UE can perform uplink transmission of the target communication data in the target time period, a part of the uplink resources that can be allocated by the base station to the UE are reserved for the UE to perform uplink transmission of the target communication data. For example, the reserved uplink resource may be a last communication resource in the target time period. The reserved uplink resource is used for the UE to transmit a HARQ for the last downlink transmission in the target time period.

In addition, since the UE needs to perform uplink transmission of a HARQ for each downlink transmission, the number of the reserved uplink resources can be obtained according to the number of downlink resources allocated by the base station to the UE in the target time period.

As described above, in some cases, the base station is required to reserve a part of uplink resources for the UE to perform uplink transmission of the target communication data. Therefore, when the base station is required to allocate the uplink resource to the UE and the uplink resource to be allocated is not used for the UE to perform uplink transmission of the target communication data, the base station is required to determine whether the number of the remaining allocable uplink resources is greater than 0, and is also required to determine whether the remaining allocable uplink resources include the reserved uplink resources.

When the remaining allocable uplink resources include the reserved uplink resources, the base station is required to determine whether the difference between the first number (i.e., the number of the remaining allocable uplink resources) and the number of the reserved uplink resources is greater than 0. When the difference between the first number and the number of the reserved uplink resources is greater than 0, it is indicated that the remaining allocable uplink resources include other allocable uplink resources in addition to the reserved uplink resources. In such case, the base station may allocate the uplink resource to the UE. When the difference between the first number and the number of the reserved uplink resources is equal to 0, it is indicated that there is no other allocable uplink resources in the remaining allocable uplink resources except the reserved uplink resources. In this case, the base station may not allocate any uplink resource to the UE.

Optionally, when the base station does not allocate any uplink resource to the UE, the base station may send uplink resource allocation failure information to the UE. The uplink resource allocation failure information indicates that a reason for an uplink resource allocation failure is that the number of the remaining allocable uplink resources (i.e., the first number) is equal to 0. After receiving the uplink resource allocation failure information, the UE may buffer uplink data to be sent, and continue to request the uplink resource from the base station when the UE occupies the target channel next time.

In 404, the base station acquires a second number after allocating the uplink resource to the UE. The second number may be, for example, a second number of uplink resources.

The second number is the number of uplink resources allocated by the base station to the UE.

In 405, the base station subtracts the second number from the first number, to obtain an updated first number.

After the base station allocates the uplink resource to the UE, the base station is required to update the number of the remaining allocable uplink resources to determine whether an uplink resource can be allocated to the UE based on the updated number of the allocable uplink resources when the uplink resource is required to be allocated to the UE next time.

Optionally, the base station may subtract the second number from the first number to obtain a difference value, thereby implementing updating of the number of the remaining allocable uplink resources. The difference value is the updated number of the allocable uplink resources (i.e., the updated first number).

When the uplink resource is required to be allocated to the UE next time, the base station may determine whether the updated first number is greater than 0 or not. When the updated first number is greater than 0, the base station may allocate the uplink resource to the UE in the manner described in step 403. When the updated first number is equal to 0, the base station may not allocate any uplink resource to the UE.

From the above, according to the uplink resource allocation method provided in the embodiment of the present disclosure, within the period of time during which when the UE occupies the target channel on the unlicensed spectrum, when the uplink resource is required to be allocated for the UE, it is determined whether the number of the remaining allocable uplink resources in the time period is greater than 0 or not, and when the number of the remaining allocable uplink resources is greater than 0, the uplink resource is allocated to the UE, the number of the remaining allocable uplink resources is obtained according to the SAR of the UE. In such a manner, it may be ensured that a proportion of uplink transmission in the time period during which the UE occupies the target channel is relatively low, so that harms of radiation accumulatively generated by the UE to a human body are avoided.

Figure 5:
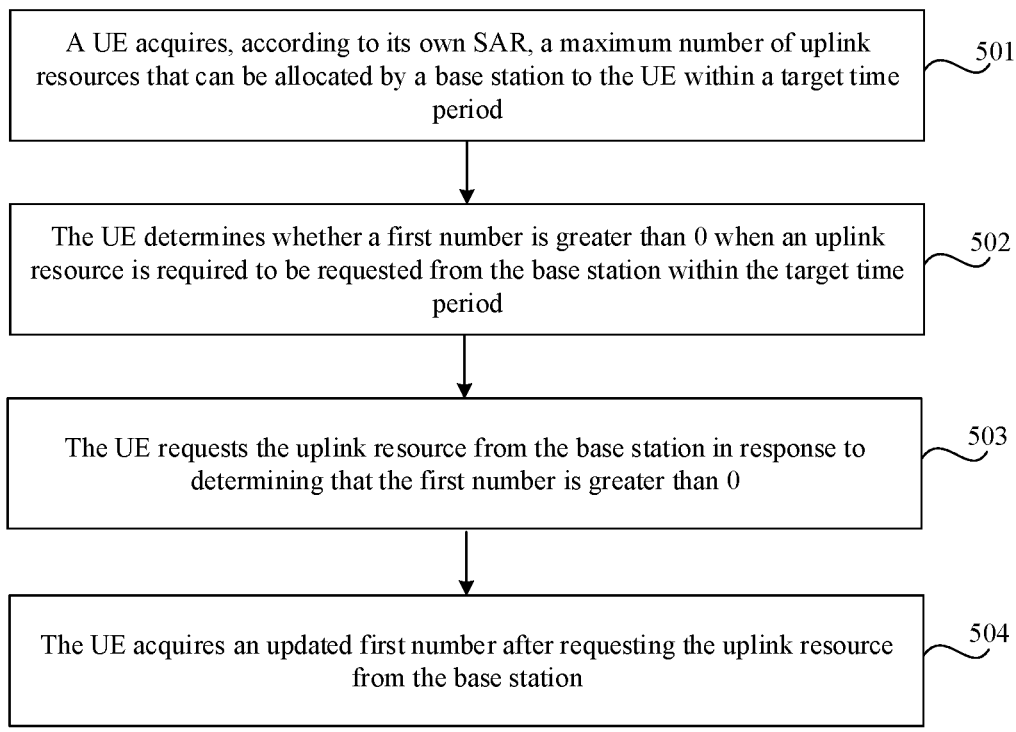
FIG. 5 is a flowchart of a method for uplink resource allocation according to an exemplary embodiment.

FIG. 5 is a flowchart of a method for uplink resource allocation according to an exemplary embodiment. As illustrated in FIG. 5, the method for uplink resource allocation is applied to the implementation environment illustrated in FIG. 1. The method for uplink resource allocation includes the following steps.

In 501, a UE acquires, according to an SAR of the UE, a maximum number of uplink resources that can be allocated by a base station to the UE within a target period of time.

In the above embodiment, the base station may be prevented from allocating excessive uplink resources to the UE to ensure that radiation accumulatively generated by the UE within the target time period does not harm a human body. In the embodiment, the UE may be prevented from requesting for excessive uplink resources to ensure that radiation accumulatively generated by the UE within the target time period does not harm the human body.

For avoiding the UE requesting for excessive uplink resources, in the embodiment of the present disclosure, the UE may execute a technical process of step 501.

Two exemplary manners in which the UE acquires the maximum number are provided in step 501 and will be described below one by one.

In a first manner: the UE acquires its own SAR, and acquires the maximum number according to the SAR.

The UE may locally store the abovementioned SAR comparison table, and the UE may query the SAR comparison table according to its own SAR to obtain a target ratio. After obtaining the target ratio, the UE may acquire, according to the target ratio and a duration of the target time period, the maximum number of the uplink resources that the base station can allocate to the UE within the target time period.

A technical process that the UE queries the SAR comparison table according to its own SAR to obtain the target ratio is similar to the above, and will not be elaborated in the embodiment of the present disclosure.

In a second manner: the UE receives the maximum number from the base station.

As described above, in step 401, the base station may acquire the maximum number according to the SAR sent by the UE or the target ratio. After obtaining the maximum number, the base station may send the maximum number to the UE. The UE may receive the maximum number sent by the base station.

Optionally, the base station may send the maximum number to the UE through physical-layer uplink control signaling, high-layer signaling, MAC CE signaling or the like.

In 502, the UE determines whether a first number is greater than 0 when an uplink resource is required to be requested from the base station within the target period of time.

A meaning of the first number in the embodiment is the same as a meaning of the first number in the above embodiment, and will not be elaborated herein.

The condition that "the uplink resource is required to be requested from the base station" may refer to that the UE has uplink data required to be sent to the base station.

In 503, the UE requests the uplink resource from the base station in response to determining that the first number is greater than 0.

When the first number is greater than 0, it is indicated that the number of uplink resources that the base station has allocated to the UE at present has yet not reached the maximum number of the uplink resources that the base station can allocate to the UE. In such case, the UE may request the uplink resource from the base station. For example, the UE may send an SR or a BSR to the base station.

When the first number is equal to 0, it is indicated that the number of the uplink resources that the base station has allocated to the UE at present has reached the maximum number of the uplink resources that the base station can allocate to the UE. In such case, the UE may not request any uplink resource from the base station.

Optionally, when the first number is greater than 0, it is likely that the number of uplink resources the UE is required to request for is greater than the first number. In such case, the UE may request the base station for uplink resources in a number equal to the first number to avoid harms of the radiation accumulatively generated by the UE within the target period of time to the human body.

Similar to the above, in some cases, a part of uplink resources are required to be reserved for the UE to perform uplink transmission of target communication data. Therefore, when the UE requests the base station for an uplink resource and the requested uplink resource is not used for the UE to perform uplink transmission of the target communication data, the UE is required to determine whether the number of the remaining allocable uplink resources is greater than 0, and is also required to determine whether the remaining allocable uplink resources include the reserved uplink resources.

When the remaining allocable uplink resources include the reserved uplink resources, the UE is required to determine whether a difference between the first number (i.e., the number of the remaining allocable uplink resources) and the number of the reserved uplink resources is greater than 0. When the difference between the first number and the number of the reserved uplink resources is greater than 0, it is indicated that the remaining allocable uplink resources include other allocable uplink resources in addition to the reserved uplink resources. In such case, the UE may request the uplink resource from the base station. When the difference between the first number and the number of the reserved uplink resources is equal to 0, it is indicated that there is no other allocable uplink resources in the remaining allocable uplink resources except the reserved uplink resources. In such case, the UE may not request any uplink resource from the base station.

In the embodiment, the reserved uplink resources, the target communication data and the like are similar to those in the above embodiment, and will not be elaborated herein.

In 504, the UE acquires an updated first number after requesting the uplink resource from the base station.

In a possible implementation, in step 405, after the base station acquires the updated first number, the base station may send the updated first number to the UE, and the UE may receive the updated first number sent by the base station.

Optionally, the UE may receive the updated first number sent by the base station in a process of receiving downlink communication data sent by the base station; alternatively, the UE may receive the updated first number sent by the base station in a process during which the base station allocates the uplink resources to the UE according to the request of the UE.

Optionally, the base station may send the updated first number to the UE through the physical-layer uplink control signaling, the high-layer signaling, the MAC CE signaling or the like.

In another possible implementation, after the base station allocates the uplink resources to the UE according to the request of the UE, the UE may perform uplink transmission by use of the uplink resources, and meanwhile, the UE may determine the abovementioned second number, and subtract the second number from the first number to obtain the updated first number.

When an uplink resource is required to requested from the base station next time, the UE may determine whether the updated first number is greater than 0. When the updated first number is greater than 0, the UE may request the uplink resource from the base station. When the updated first number is equal to 0, the UE may not request any uplink resource from the base station.

From the above, according to the uplink resource allocation method provided in the embodiment of the present disclosure, within the time period during which the UE occupies the target channel on the unlicensed spectrum, when the uplink resource is required to be requested from the base station, it is determined whether the number of the remaining allocable uplink resources within the time period is greater than 0, and when the number of the remaining allocable uplink resources is greater than 0, the uplink resource is requested from the base station, where the number of the remaining allocable uplink resources is obtained according to the SAR of the UE. In such a manner, it may be ensured that a proportion of uplink transmission within the time period during which the UE occupies the target channel is relatively low, so that harms of radiation accumulatively generated by the UE to a human body are avoided.

Figure 6:
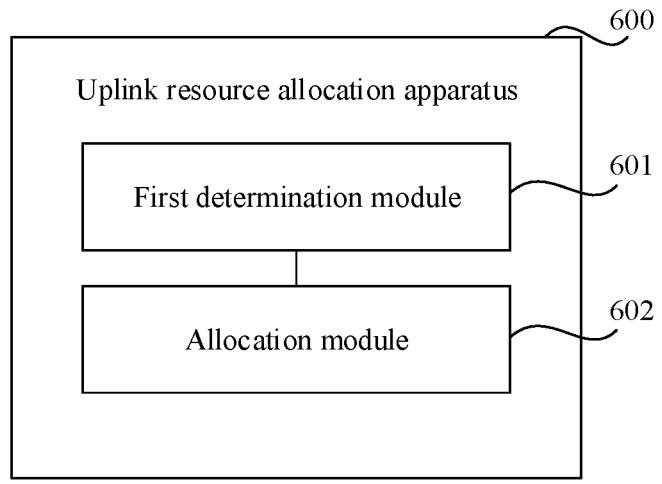
FIG. 6 is a block diagram of an apparatus for uplink resource allocation according to an exemplary embodiment.

FIG. 6 is a block diagram of an apparatus for uplink resource allocation 600 according to an exemplary embodiment. The apparatus for uplink resource allocation 600 may be arranged in the base station 10 illustrated in FIG. 1.

Referring to FIG. 6, the apparatus for uplink resource allocation 600 includes a first determination module 601 and an allocation module 602.

The first determination module 601 is configured to determine whether a first number is greater than 0 when an uplink resource is required to be allocated to a user equipment (UE) within a period of time during which the UE occupies a target channel, the first number being a number of remaining allocable uplink resources within the period of time.

The allocation module 602 is configured to allocate the uplink resource to the UE when the first number is greater than 0.

The first number is obtained according to an SAR of the UE, and the target channel is on an unlicensed spectrum.

In an embodiment of the present disclosure, the allocation module 602 is specifically configured to, when the first number is greater than 0, determine whether the remaining allocable uplink resources in the time period include at least one reserved uplink resource, the reserved uplink resource being used for transmitting target communication data; when the remaining allocable uplink resources in the time period include the at least one reserved uplink resource, determine whether a difference between the first number and the number of the at least one reserved uplink resource is greater than 0 or not; and when the difference is greater than 0, allocate the uplink resource to the UE.

In an embodiment of the present disclosure, the target communication data is a HARQ, and the at least one reserved uplink resource is a last communication resource in the time period.

In an embodiment of the present disclosure, the number of the at least one reserved uplink resources is obtained according to the number of downlink resources allocated by the base station to the UE in the time period.

Figure 7:
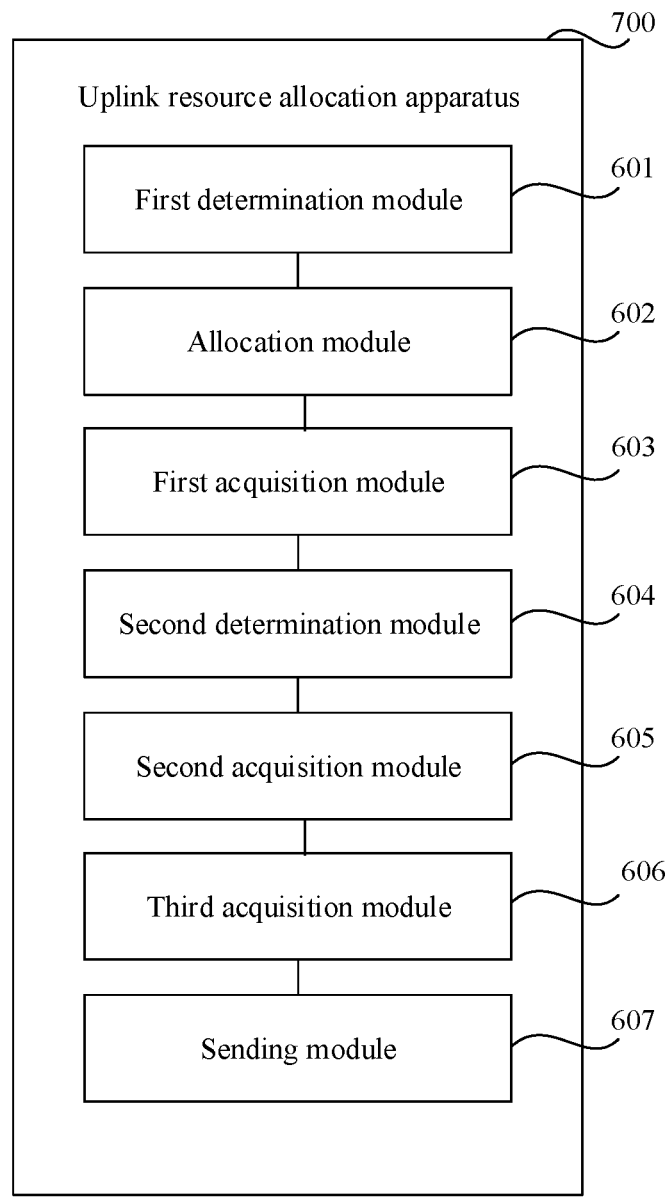
FIG. 7 is a block diagram of an apparatus for uplink resource allocation according to an exemplary embodiment.

As illustrated in FIG. 7, the embodiment of the present disclosure also provides another apparatus for uplink resource allocation 700. Besides each module of the apparatus for uplink resource allocation 600, the apparatus for uplink resource allocation 700 may further include a first acquisition module 603, a second determination module 604, a second acquisition module 605, a third acquisition module 606 and a sending module 607.

The first acquisition module 603 is configured to acquire, according to the SAR of the UE, a maximum number of uplink resources that can be allocated by a base station to the UE within the period of time.

The second determination module 604 is configured to, when the UE starts occupying the target channel, determine the maximum number of the uplink resources that can be allocated by the base station to the UE as the first number.

In an embodiment of the present disclosure, the first acquisition module 603 is specifically configured to receive SAR sent by the UE; acquire a target ratio according to the SAR, the target ratio being a ratio of a maximum number of uplink resources that the base station can allocate to the UE per unit time to the number of all communication resources per unit time; and acquire, according to the target ratio and a duration of the time period, the maximum number of the uplink resources that can be allocated by the base station to the UE within the time period.

In an embodiment of the present disclosure, the first acquisition module 603 is specifically configured to receive the target ratio sent by the UE, the target ratio being the ratio of the maximum number of the uplink resources that the base station can allocate to the UE in the unit time to the number of all the communication resources in the unit time and the target ratio being obtained by the UE according to the SAR; and acquire, according to the target ratio and the duration of the time period, the maximum number of the uplink resources that the base station can allocate to the UE within the time period.

In an embodiment of the present disclosure, the first acquisition module 603 is specifically configured to receive the maximum number of the uplink resources that the base station can allocate to the UE in the time period from the UE. The maximum number of the uplink resources that the base station can allocate to the UE in the time period is obtained by the UE according to the SAR.

The second acquisition module 605 is configured to, after the uplink resource is allocated to the UE, acquire a second number, the second number being the number of uplink resources allocated to the UE.

The third acquisition module 606 is configured to subtract the second number from the first number to obtain an updated first number. The updated first number is used for the base station to determine whether the updated first number is greater than 0 or not when an uplink resource is required to be allocated to the UE again and, when the updated first number is greater than 0, allocate the uplink resource to the UE again.

The sending module 607 is configured to send the updated first number to the UE. The updated first number is used for the UE to determine whether the updated first number is greater than 0 or not when an uplink resource is required to be requested from the base station and, when the updated first number is greater than 0, request the uplink resource from the base station.

In an embodiment of the present disclosure, the sending module 607 is specifically configured to send the updated first number to the UE in a process of sending downlink communication data to the UE; or, send the updated first number to the UE in a process of allocating the uplink resource to the UE.

From the above, according to the uplink resource allocation apparatus provided in the embodiment of the present disclosure, within the time period during which the UE occupies the target channel on the unlicensed spectrum, when the uplink resource is required to be allocated to the UE, it is determined whether the number of the remaining allocable uplink resources within the time period is greater than 0 or not, and when the number of the remaining allocable uplink resources is greater than 0, the uplink resource is allocated to the UE. The number of the remaining allocable uplink resources is obtained according to the SAR of the UE. In such a manner, it may be ensured that a proportion of uplink transmission in the time period during which the UE occupies the target channel is relatively low, so that harms of radiation accumulatively generated by the UE to a human body are avoided.

With respect to the apparatus in the above embodiment, the specific manners for performing operations for individual modules therein have been described in detail in the embodiment regarding the method, which will not be elaborated herein.

Figure 8:
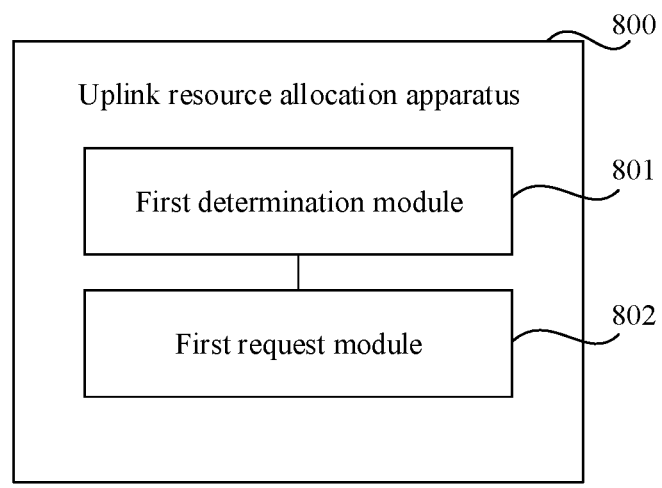
FIG. 8 is a block diagram of an apparatus for uplink resource allocation according to an exemplary embodiment.

FIG. 8 is a block diagram of an apparatus for uplink resource allocation 800 according to an exemplary embodiment. The apparatus for uplink resource allocation 800 may be arranged in the UE 20 illustrated in FIG. 1. Referring to FIG. 8, the apparatus for uplink resource allocation 800 includes a first determination module 801 and a first request module 802.

The first determination module 801 is configured to determine whether a first number is greater than 0 when an uplink resource is required to be requested from a base station within a period of time during which a target channel is occupied, the first number being a number of remaining allocable uplink resources within the period of time.

The first request module 802 is configured to, when the first number is greater than 0, request the uplink resource from the base station.

The first number is obtained according to an SAR of UE, and the target channel is on an unlicensed spectrum.

In an embodiment of the present disclosure, the first request module 802 is specifically configured to, when the first number is greater than 0, determine whether the remaining allocable uplink resources in the time period include at least one reserved uplink resource or not, the at least one reserved uplink resource being used for transmitting target communication data; when the remaining allocable uplink resources in the time period include the at least one reserved uplink resource, determine whether a difference between the first number and a number of the at least one reserved uplink resource is greater than 0 or not; and when the difference is greater than 0, request the uplink resource from the base station.

In an embodiment of the present disclosure, the target communication data is a HARQ, and the at least one reserved uplink resource is a last communication resource in the time period.

In an embodiment of the present disclosure, the number of the at least one reserved uplink resource is obtained according to the number of downlink resources allocated by the base station to the UE in the time period.

Figure 9:
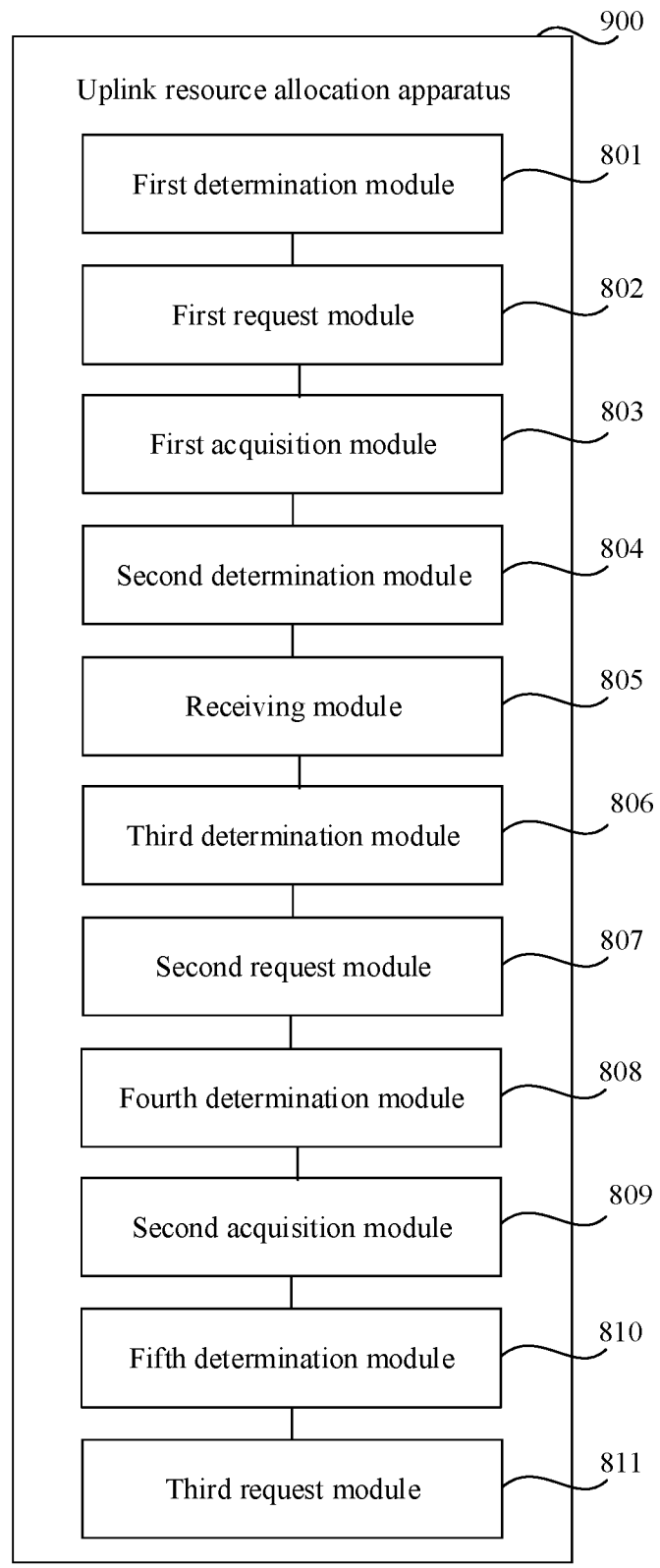
FIG. 9 is a block diagram of an apparatus for uplink resource allocation according to an exemplary embodiment.

As illustrated in FIG. 9, the embodiment of the present disclosure also provides another apparatus for uplink resource allocation 900. Besides each module of the apparatus for uplink resource allocation 800, the apparatus for uplink resource allocation 900 may further include a first acquisition module 803, a second determination module 804, a receiving module 805, a third determination module 806, a second request module 807, a fourth determination module 808, a second acquisition module 809, a fifth determination module 810 and a third request module 811.

The first acquisition module 803 is configured to acquire, according to an SAR of the UE, a maximum number of uplink resources that the base station can allocate to the UE in the time period.

The second determination module 804 is configured to, when the target channel is started to be occupied, determine the maximum number of the uplink resources that the base station can allocate to the UE as the first number.

In an embodiment of the present disclosure, the first acquisition module 803 is specifically configured to acquire the SAR; acquire a target ratio according to the SAR, the target ratio being a ratio of a maximum number of uplink resources that the base station can allocate to the UE per unit time to the number of all communication resources per the unit time; and acquire, according to the target ratio and a duration of the time period, the maximum number of the uplink resources that the base station can allocate to the UE in the time period.

In an embodiment of the present disclosure, the first acquisition module 803 is specifically configured to receive the maximum number of the uplink resources that the base station can allocate to the UE in the time period from the base station. The maximum number of the uplink resources that the base station can allocate to the UE in the time period is obtained by the base station according to the SAR or the target ratio sent by the UE, and the target ratio is the ratio of the maximum number of the uplink resources that the base station can allocate to the UE per unit time to the number of all the communication resources per unit time.

The receiving module 805 is configured to receive an updated first number sent by the base station.

The third determination module 806 is configured to, when an uplink resource is required to be requested from the base station again, determine whether the updated first number is greater than 0 or not.

The second request module 807 is configured to, when the updated first number is greater than 0, request the uplink resource from the base station again. The updated first number is obtained by subtracting a second number from the first number after the base station allocates uplink resources to the UE according to the request of the UE, and the second number is the number of the uplink resources allocated by the base station to the UE according to the request of the UE.

In an embodiment of the present disclosure, the receiving module 805 is specifically configured to receive the updated first number sent by the base station in a process of receiving downlink communication data sent by the base station; or, receive the updated first number sent by the base station in a process that the base station allocates the uplink resources to the UE according to the request of the UE.

The fourth determination module 808 is configured to, after the base station allocates the uplink resources to the UE according to the request of the UE, determine the second number, the second number being the number of the uplink resources allocated by the base station to the UE according to the request of the UE.

The second acquisition module 809 is configured to subtract the second number from the first number to obtain the updated first number.

The fifth determination module 810 is configured to, when an uplink resource is required to be requested from the base station again, determine whether the updated first number is greater than 0 or not.

The third request module 811 is configured to, when the updated first number is greater than 0, request the uplink resource from the base station again.

From the above, according to the uplink resource allocation apparatus provided in the embodiment of the present disclosure, within the time period during which the UE occupies the target channel on the unlicensed spectrum, when the uplink resource is required to be requested from the base station, it is determined whether the number of the remaining allocable uplink resources in the time period is greater than 0 or not, and when the number of the remaining allocable uplink resources is greater than 0, the uplink resource is requested from the base station. The number of the remaining allocable uplink resources is obtained according to the SAR of the UE. In such a manner, it may be ensured that a proportion of uplink transmission in the time period during which the UE occupies the target channel is relatively low, so that harms of radiation accumulatively generated by the UE to a human body are avoided.

With respect to the apparatus in the above embodiment, the specific manners for performing operations for individual modules therein have been described in detail in the embodiment regarding the method, which will not be elaborated herein.

Figure 10:
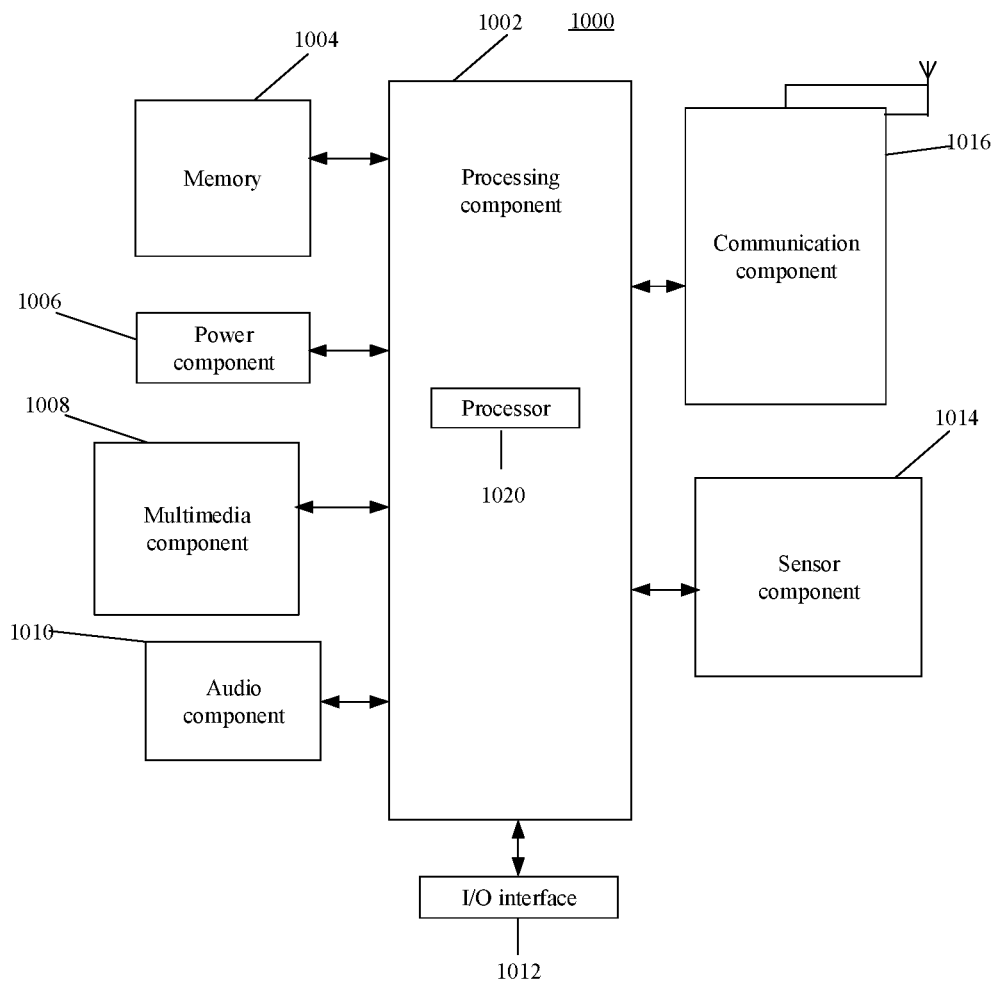
FIG. 10 is a block diagram of a device for uplink resource allocation according to an exemplary embodiment.

FIG. 10 is a block diagram of a device for uplink resource allocation 1000 according to an exemplary embodiment. For example, the device 1000 may be a mobile phone, a computer, a digital broadcast terminal, a messaging device, a gaming console, a tablet, a medical device, exercise equipment, a personal digital assistant and the like.

Referring to FIG. 10, the device 1000 may include one or more of the following components: a processing component 1002, a memory 1004, a power component 1006, a multimedia component 1008, an audio component 1010, an Input/Output (I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 may include one or more processors 1020 to execute instructions to perform all or part of the steps in the abovementioned method. Moreover, the processing component 1002 may include one or more modules which facilitate interaction between the processing component 1002 and the other components. For instance, the processing component 1002 may include a multimedia module to facilitate interaction between the multimedia component 1008 and the processing component 1002.

The memory 1004 is configured to store various types of data to support the operation of the device 1000. Examples of such data include instructions for any applications or methods operated on the device 1000, contact data, phonebook data, messages, pictures, video, etc. The memory 1004 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1006 provides power for various components of the device 1000. The power component 1006 may include a power management system, one or more power supplies, and other components associated with generation, management and distribution of power for the device 1000.

The multimedia component 1008 includes a screen providing an output interface between the device 1000 and a user. In some embodiments, the screen may include a Liquid Crystal Display (LCD) and a Touch Panel (TP). If the screen includes the TP, the screen may be implemented as a touch screen to receive an input signal from the user. The touch panel includes one or more touch sensors to sense touches, swipes and gestures on the touch panel. The touch sensors may not only sense a boundary of a touch or swipe action but also detect a duration and pressure associated with the touch or swipe action. In some embodiments, the multimedia component 1008 includes a front camera and/or a rear camera. The front camera and/or the rear camera may receive external multimedia data when the device 1000 is in an operation mode, such as a photographing mode or a video mode. Each of the front camera and the rear camera may be a fixed optical lens system or have focusing and optical zooming capabilities.

The audio component 1010 is configured to output and/or input an audio signal. For example, the audio component 1010 includes a Microphone (MIC), and the MIC is configured to receive an external audio signal when the device 1000 is in the operation mode, such as a call mode, a recording mode and a voice recognition mode. The received audio signal may further be stored in the memory 1004 or sent through the communication component 1016. In some embodiments, the audio component 1010 further includes a speaker configured to output the audio signal.

The I/O interface 1012 provides an interface between the processing component 1002 and a peripheral interface module, and the peripheral interface module may be a keyboard, a click wheel, a button and the like. The button may include, but not limited to: a home button, a volume button, a starting button and a locking button.

The sensor component 1014 includes one or more sensors configured to provide status assessment in various aspects for the device 1000. For instance, the sensor component 1014 may detect an on/off status of the device 1000 and relative positioning of components, such as a display and small keyboard of the device 1000, and the sensor component 1014 may further detect a change in a position of the device 1000 or a component of the device 1000, presence or absence of contact between the user and the device 1000, orientation or acceleration/deceleration of the device 1000 and a change in temperature of the device 1000. The sensor component 1014 may include a proximity sensor configured to detect presence of an object nearby without any physical contact. The sensor component 1014 may also include a light sensor, such as a Complementary Metal Oxide Semiconductor (CMOS) or Charge Coupled Device (CCD) image sensor, configured for use in an imaging application. In some embodiments, the sensor component 1014 may also include an acceleration sensor, a gyroscope sensor, a magnetic sensor, a pressure sensor or a temperature sensor.

The communication component 1016 is configured to facilitate wired or wireless communication between the device 1000 and another device. The device 1000 may access a communication-standard-based wireless network, such as a Wireless Fidelity (WiFi) network, a 2nd-Generation (2G) or 3rd-Generation (3G) network or a combination thereof. In an exemplary embodiment, the communication component 1016 receives a broadcast signal or broadcast associated information from an external broadcast management system through a broadcast channel. In an exemplary embodiment, the communication component 1016 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the device 1000 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including instructions, such as the memory 1004 including instructions, and the instructions may be executed by the processor 1020 of the device 1000 to perform the method provided in the abovementioned embodiment. For example, the non-transitory computer-readable storage medium may be a ROM, a Random Access Memory (RAM), a Compact Disc Read-Only Memory (CD-ROM), a magnetic tape, a floppy disc, an optical data storage device and the like.

In an exemplary embodiment, there is also provided a non-transitory computer-readable storage medium having stored therein instructions that, when executed by a processor of a mobile terminal, to cause the mobile terminal to execute the steps in the uplink resource allocation method provided in the abovementioned embodiment.

Figure 11:
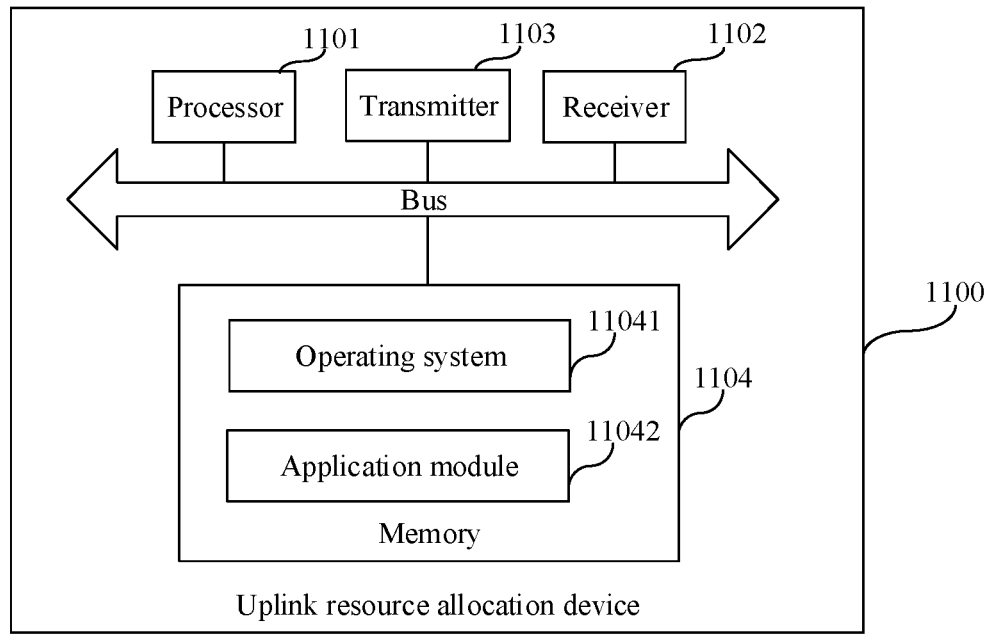
FIG. 11 is a block diagram of a device for uplink resource allocation according to an exemplary embodiment.

FIG. 11 is a block diagram of a device for uplink resource allocation 1100 according to an exemplary embodiment. For example, the device for uplink resource allocation 1100 may be a base station. As illustrated in FIG. 11, the uplink resource allocation device 1100 may include a processor 1101, a receiver 1102, a transmitter 1103 and a memory 1104. The receiver 1102, the transmitter 1103 and the memory 1104 are connected with the processor 1101 through a bus respectively.

The processor 1101 includes one or more than one processing core, and the processor 1101 runs a software program and a module to execute the method executed by the base station in the uplink resource allocation methods provided in the embodiments of the present disclosure. The memory 1104 may be configured to store the software program and the module. Specifically, the memory 1104 may store an operating system 11041 and an application module 11042 required by at least one function. The receiver 1102 is configured to receive communication data sent by another device, and the transmitter 1103 is configured to send communication data to the other device.

Figure 12:
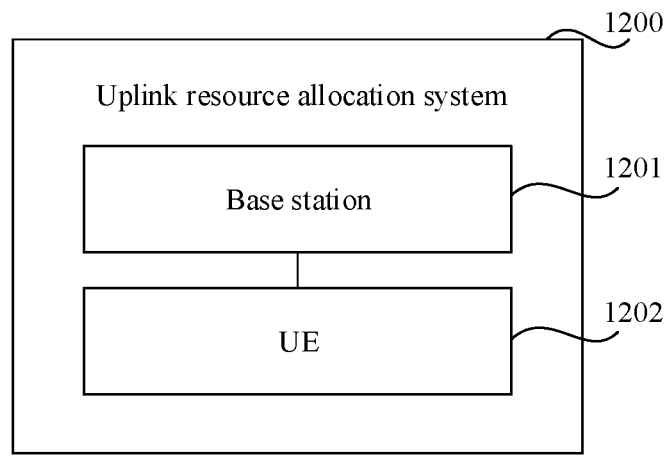
FIG. 12 is a block diagram of a system for uplink resource allocation according to an exemplary embodiment.

FIG. 12 is a block diagram of a system for uplink resource allocation 1200 according to an exemplary embodiment. As illustrated in FIG. 12, the uplink resource allocation system 1200 includes a base station 1201 and a UE 1202.

The base station 1201 is configured to execute the uplink resource allocation method executed by a base station in the abovementioned method embodiments.

The UE 1202 is configured to execute the uplink resource allocation method executed by UE in the abovementioned method embodiments.

In an exemplary embodiment, there is also provided a computer-readable storage medium. The computer-readable storage medium is a non-volatile computer-readable storage medium. A computer program is stored in the computer-readable storage medium. The stored computer program is executed by a processing component to perform the uplink resource allocation methods provided in the abovementioned embodiments of the present disclosure.

The embodiments of the present disclosure also provide a computer program product, in which instructions is stored. When the instructions run in a computer, the computer may execute the uplink resource allocation methods provided in the embodiments of the present disclosure.

The embodiments of the present disclosure also provide a chip, which includes a programmable logic circuit and/or program instructions and may run to execute the uplink resource allocation methods provided in the embodiments of the present disclosure.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for uplink resource allocation, comprising:
    determining, when an uplink resource is required to be allocated to a user equipment (UE) within a period of time, that a first number of uplink resources is greater than 0, wherein the UE occupies a target channel during the period of time and wherein the first number of uplink resources comprise a number of remaining allocable uplink resources within the period of time; and
    allocating the uplink resource to the UE,
    wherein the first number of uplink resources is obtained according to a specific absorption rate (SAR) of the UE, and the target channel is on an unlicensed frequency spectrum.

2. The method of claim 1, further comprising:
    acquiring, according to the SAR of the UE, a maximum number of uplink resources that can be allocated by a base station to the UE within the period of time; and
    determining the maximum number of the uplink resources that can be allocated by the base station to the UE as the first number of uplink resources when the UE starts occupying the target channel.

3. The method of claim 2, wherein acquiring, according to the SAR of the UE, the maximum number of the uplink resources that can be allocated by the base station to the UE within the period of time comprises:
    receiving the SAR from the UE;
    acquiring a target ratio according to the SAR, wherein the target ratio comprises a ratio of a maximum number of uplink resources that the base station can allocate to the UE per unit time to a number of all communication resources included per unit time; and
    acquiring, according to the target ratio and a duration of the period of time, the maximum number of the uplink resources that can be allocated by the base station to the UE within the period of time.

4. The method of claim 2, wherein acquiring, according to the SAR of the UE, the maximum number of the uplink resources that can be allocated by the base station to the UE within the period of time comprises:
    receiving a target ratio from the UE, wherein the target ratio comprises a ratio of a maximum number of uplink resources that the base station can allocate to the UE per unit time to a number of all communication resources included per unit time, and is obtained by the UE according to the SAR; and
    acquiring, according to the target ratio and a duration of the period of time, the maximum number of the uplink resources that can be allocated by the base station to the UE within the period of time.

5. The method of claim 2, wherein acquiring, according to the SAR of the UE, the maximum number of the uplink resources that can be allocated by the base station to the UE within the period of time comprises:
    receiving the maximum number of the uplink resources that can be allocated by the base station to the UE within the period of time from the UE,
    wherein the maximum number of the uplink resources that can be allocated by the base station to the UE within the period of time is obtained by the UE according to the SAR.

6. The method of claim 1, further comprising:
    acquiring a second number of uplink resources after allocating the uplink resource to the UE, wherein the second number of uplink resources comprise a number of uplink resources allocated to the UE; and obtaining an updated first number of uplink resources by subtracting the second number of uplink resources from the first number of uplink resources, wherein the updated first number of uplink resources is used for a base station to determine that the updated first number of uplink resources is greater than 0 when an uplink resource is required to be allocated to the UE again and allocate the uplink resource to the UE again when the updated first number of uplink resources is greater than 0.

7. The method of claim 6, further comprising:

sending the updated first number of uplink resources to the UE, wherein the updated first number of uplink resources is used for the UE to determine that the updated first number of uplink resources is greater than 0 when an uplink resource is required to be requested from the base station and request the uplink resource from the base station when the updated first number of uplink resources is greater than 0.

8. The method of claim 7, wherein sending the updated first number of uplink resources to the UE comprises one of:

sending the updated first number of uplink resources to the UE in a process of sending downlink communication data to the UE; or, sending the updated first number of uplink resources to the UE in a process of allocating the uplink resource to the UE.

9. The method of claim 1, wherein allocating the uplink resource to the UE in response to determining that the first number of uplink resources is greater than 0 comprises:

determining that the remaining allocable uplink resources within the period of time comprise at least one reserved uplink resource, wherein the at least one reserved uplink resource is used for transmitting target communication data;

determining that a difference between the first number of uplink resources and a number of the at least one reserved uplink resource is greater than 0; and allocating the uplink resource to the UE.

10. The method of claim 9, wherein the target communication data comprises a hybrid automatic repeat request (HARQ), and the at least one reserved uplink resource comprises a last communication resource in the period of time.

11. A method for uplink resource allocation, comprising:

determining, when an uplink resource is required to be requested from a base station within a period of time, that a first number of uplink resources is greater than 0, wherein the UE occupies a target channel during the period of time and wherein the first number of uplink resources comprise a number of remaining allocable uplink resources within the period of time; and requesting the uplink resource from the base station, wherein the first number of uplink resources is obtained according to a specific absorption rate (SAR) of a user equipment (UE), and the target channel is on an unlicensed frequency spectrum.

12. The method of claim 11, further comprising:

acquiring, according to the SAR of the UE, a maximum number of uplink resources that can be allocated by the base station to the UE within the period of time; and determining the maximum number of the uplink resources that can be allocated by the base station to the UE as the first number of uplink resources when the target channel is started to be occupied.

13. The method of claim 12, wherein acquiring, according to the SAR of the UE, the maximum number of the uplink resources that can be allocated by the base station to the UE within the period of time comprises:

acquiring the SAR;

acquiring a target ratio according to the SAR, wherein the target ratio comprises a ratio of a maximum number of uplink resources that the base station can allocate to the UE per unit time to a number of all communication resources included per unit time; and acquiring, according to the target ratio and a duration of the period of time, the maximum number of the uplink resources that can be allocated by the base station to the UE within the period of time.

14. The method of claim 12, wherein acquiring, according to the SAR of the UE, the maximum number of the uplink resources that can be allocated by the base station to the UE within the period of time comprises:

receiving the maximum number of the uplink resources that can be allocated by the base station to the UE within the period of time from the base station, wherein the maximum number of the uplink resources that can be allocated by the base station to the UE within the period of time is obtained by the base station according to the SAR or a target ratio sent by the UE, and the target ratio comprises a ratio of a maximum number of uplink resources that the base station can allocate to the UE per unit time to a number of all communication resources per unit time.

15. The method of claim 11, further comprising:

receiving an updated first number of uplink resources from the base station;

determining whether the updated first number of uplink resources is greater than 0 when an uplink resource is required to be requested from the base station again; and requesting the uplink resource from the base station again in response to determining that the updated first number of uplink resources is greater than 0, wherein the updated first number of uplink resources is obtained by subtracting a second number of uplink resources from the first number of uplink resources after the base station allocates the uplink resource to the UE according to a request of the UE, and the second number of uplink resources comprise a number of uplink resources allocated by the base station to the UE according to the request of the UE.

16. The method of claim 15, wherein receiving the updated first number of uplink resources from the base station comprises one of:

receiving the updated first number of uplink resources sent by the base station in a process of receiving downlink communication data sent by the base station; or, receiving the updated first number of uplink resources sent by the base station in a process that the base station allocates the uplink resources to the UE according to the request of the UE.

17. The method of claim 11, further comprising:

determining a second number of uplink resources after the base station allocates the uplink resource to the UE according to a request of the UE, wherein the second number of uplink resources comprise a number of the uplink resources allocated by the base station to the UE according to the request of the UE;

subtracting the second number of uplink resources from the first number of uplink resources, to obtain an updated first number of uplink resources, determining whether the updated first number of uplink resources is greater than 0 when an uplink resource is required to be requested from the base station again; and requesting the uplink resource from the base station again in response to determining that the updated first number of uplink resources is greater than 0.

18. The method of claim 11, wherein requesting the uplink resource from the base station in response to determining that the first number of uplink resources is greater than 0 comprises:

determining whether the remaining allocable uplink resources within the period of time comprise at least one reserved uplink resource in response to determining that the first number of uplink resources is greater than 0, wherein the at least one reserved uplink resource is used for transmitting target communication data;

determining whether a difference between the first number of uplink resources and a number of the at least one reserved uplink resource is greater than 0 in response to determining that the remaining allocable uplink resources within the period of time comprise the at least one reserved uplink resource; and requesting the uplink resource from the base station in response to determining that the difference is greater than 0.

19. A computing device, comprising:

one or more processors; and a tangible non-transitory computer-readable storage medium configured to store a plurality of instructions executable by the one or more processors, wherein the one or more processors are configured to:

determine, when an uplink resource is required to be allocated to a user equipment (UE) within a period of time, that a first number of uplink resources is greater than 0, wherein the UE occupies a target channel during the period of time and wherein the first number of uplink resources comprise a number of remaining allocable uplink resources within the period of time; and allocate the uplink resource to the UE, wherein the first number of uplink resources is obtained according to a specific absorption rate (SAR) of the UE, and the target channel is on an unlicensed frequency spectrum.

20. A computing device, comprising:

one or more processors; and a tangible non-transitory computer-readable storage medium configured to store a plurality of instructions executable by the one or more processors, wherein the one or more processors is configured to:

determine, when an uplink resource is required to be requested from a base station within a period of time, that a first number of uplink resources is greater than 0, wherein the UE occupies a target channel during the period of time and wherein the first number of uplink resources comprise a number of remaining allocable uplink resources within the time period; and request the uplink resource from the base station when the first number of uplink resources is greater than 0, wherein the first number of uplink resources is obtained according to a specific absorption rate (SAR) of a user equipment (UE), and the target channel is on an unlicensed frequency spectrum.

* * * * *